(12) United States Patent
Niedermeier et al.

(10) Patent No.: US 10,546,151 B2
(45) Date of Patent: Jan. 28, 2020

(54) SECURE TRANSMISSION OF SENSITIVE MEASUREMENT DATA IN AN AUTOMATION NETWORK

(71) Applicant: Siemens Aktiengesellschaft, München (DE)

(72) Inventors: Christoph Niedermeier, München (DE); Norbert Vicari, München (DE)

(73) Assignee: Siemens Aktiengesellschaft (DE)

( * ) Notice: Subject to any disclaimer, the term of this patent is extended or adjusted under 35 U.S.C. 154(b) by 150 days.

(21) Appl. No.: 15/541,612

(22) PCT Filed: Nov. 26, 2015

(86) PCT No.: PCT/EP2015/077741
§ 371 (c)(1),
(2) Date: Jul. 5, 2017

(87) PCT Pub. No.: WO2016/110361
PCT Pub. Date: Jul. 14, 2016

(65) Prior Publication Data
US 2018/0004974 A1    Jan. 4, 2018

(30) Foreign Application Priority Data

Jan. 9, 2015   (DE) .................. 10 2015 200 210

(51) Int. Cl.
*G06F 21/62* (2013.01)
*G05B 15/02* (2006.01)
*H04L 12/28* (2006.01)

(52) U.S. Cl.
CPC ......... *G06F 21/6245* (2013.01); *G05B 15/02* (2013.01); *H04L 12/2803* (2013.01); *G05B 2219/2642* (2013.01)

(58) Field of Classification Search
CPC . G06F 21/6245; H04L 12/2803; G05B 15/02; G05B 2219/2642
See application file for complete search history.

(56) References Cited

U.S. PATENT DOCUMENTS

2012/0297198 A1* 11/2012 Danezis ............... H04L 9/3247
                                                          713/179
2013/0083805 A1    4/2013 Lu et al.
(Continued)

FOREIGN PATENT DOCUMENTS

CN    1449540 A    10/2003
CN    1475913 A     2/2004
(Continued)

OTHER PUBLICATIONS

International Search Report for PCT/EP2015/077741; 2 Pgs.
Non-English Chinese Office Action dated Aug. 5, 2019 for Application No. 201580072919.4.

*Primary Examiner* — Carl G Colin
*Assistant Examiner* — Han Yang
(74) *Attorney, Agent, or Firm* — Schmeiser, Olsen & Watts LLP

(57) ABSTRACT

A method and a network system for communicating confidential measured data between a plurality of decentralized, measured data-generating producers and a consumer in an automation network is provided. The following is carried out on the part of the producers: measuring or providing measured data from a plurality of sensors and classifying the measured data into security levels; checking a reliability of consumer-generated processing instructions depending on the respective classified security level; and in the case of a positive check, processing the measured data on the basis of the processing instructions, proven to be reliable, to generate (Continued)

an analysis result data set; and transmitting the analysis result data set to the consumer.

13 Claims, 4 Drawing Sheets

(56) References Cited

U.S. PATENT DOCUMENTS

| | | | | |
|---|---|---|---|---|
| 2013/0274940 | A1* | 10/2013 | Wei | G05B 19/02 700/291 |
| 2018/0082079 | A1* | 3/2018 | Burckard | G06F 21/6245 |
| 2018/0152313 | A1* | 5/2018 | Jennequin | G06F 15/16 |

FOREIGN PATENT DOCUMENTS

| | | |
|---|---|---|
| CN | 102012985 A | 4/2011 |
| CN | 102497377 A | 6/2012 |
| CN | 205038647 U | 2/2016 |
| DE | 102012202849 A1 | 8/2013 |
| JP | 2007257144 A | 10/2007 |
| WO | WO 2007075105 A1 | 7/2007 |
| WO | WO 2012055566 A2 | 5/2012 |

* cited by examiner

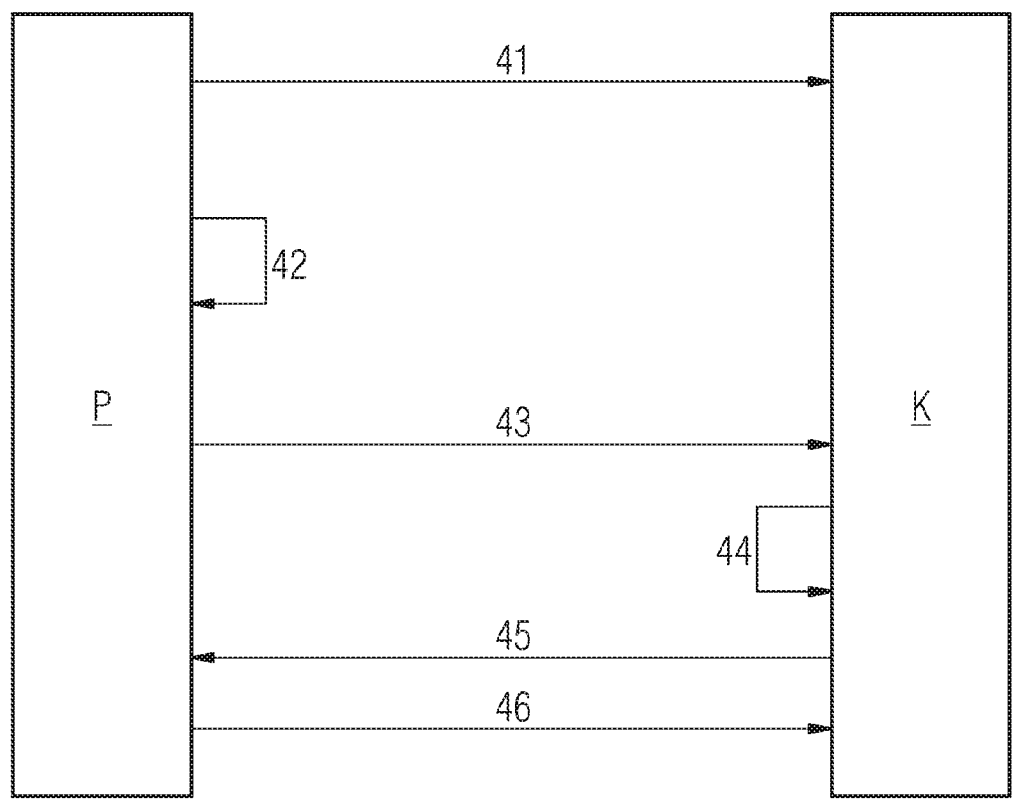
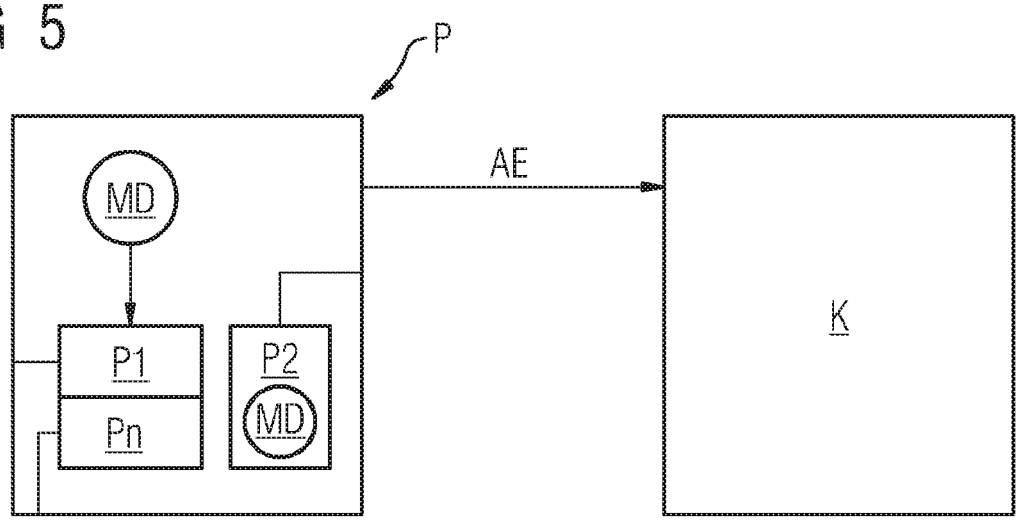

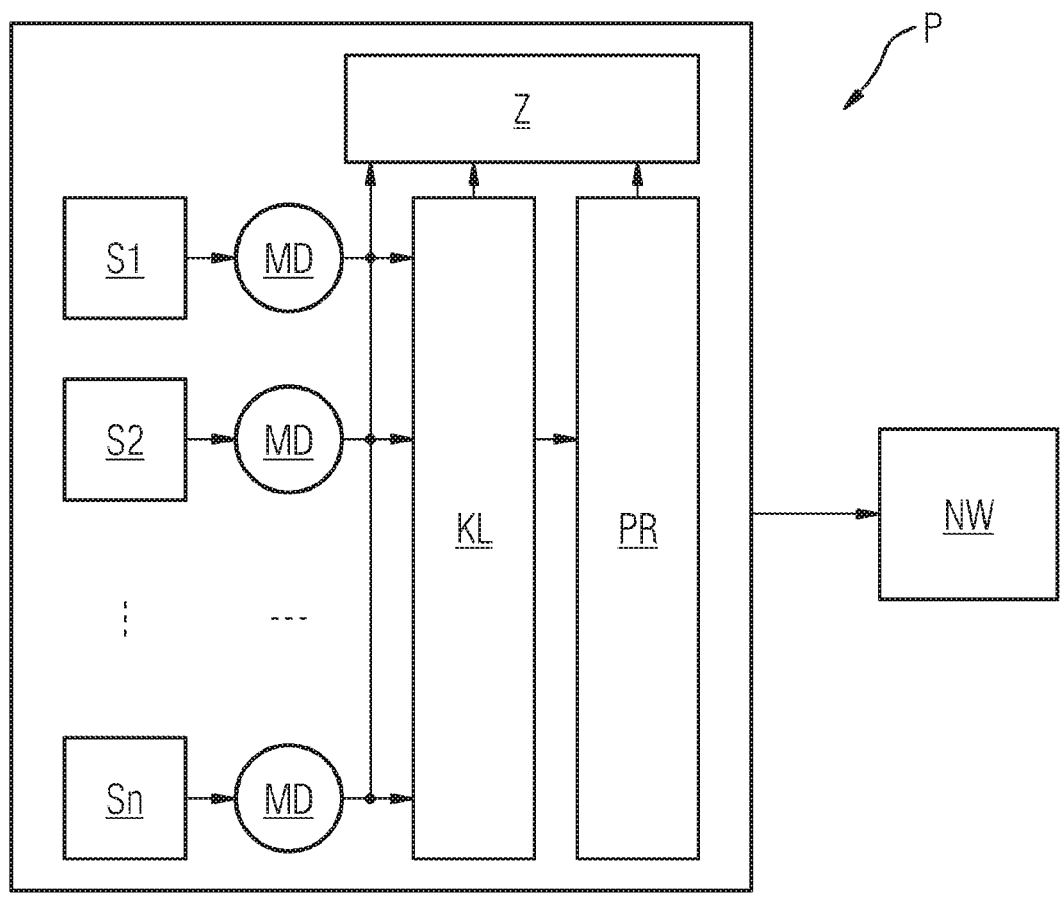

SECURE TRANSMISSION OF SENSITIVE MEASUREMENT DATA IN AN AUTOMATION NETWORK

CROSS-REFERENCE TO RELATED APPLICATIONS

This application claims priority to PCT Application No. PCT/EP2015/077741, having a filing date of Nov. 26, 2015, which is based upon and claims priority to DE Application No. 10 2015 200210.1, having a filing date of Jan. 9, 2015 the entire contents both of which are hereby incorporated by reference.

FIELD OF TECHNOLOGY

The following relates to a method for the regulation of an automation network having a multiplicity of measurement data producers by at least one central consumer on the basis of locally captured measurement data that comprise security-critical data records.

BACKGROUND

The automation network may be, inter alia, a building's automation network. In order, e.g. to be able to use the different field devices (actuators, switches, controllers or other network resources) in the automation network in optimized fashion and ensure efficient and reliable system operation, it is necessary to constantly capture state information (e.g. in the form of load flow data) as measurement data locally, e.g. in/out to the individual buildings or connected consumer locations, and to process said state information using different methods, so as then to be able to provide an analysis result—preferably to the network operator or the supplier.

The locally captured measured values and operating data are relevant to the data consumer(s) to allow it/them to use suitable analysis methods to e.g. be able to initiate optimization processes or better plan future consumptions.

During the measurement of sensor data from which network state information and load flow data are ascertained, confidential data accumulate that can be transmitted to authorized recipients only with access protection.

In known building automation systems, this has been achieved by virtue of exclusively one configurator of the system and the owner of the building actually having access to the sensitive data. For security reasons, access was therefore possible only locally (near the energy consumer). This meant that the analysis options for the central supplier were then possible only to a very limited extent, if at all.

The following is based on the object of being able to provide the data consumer with an analysis result without the need for security-critical data to be transmitted from the respective network nodes on which the data are measured to the data consumer(s).

SUMMARY

An aspect relates to a method that can be used for the regulation of an automation network by at least one central consumer. The automation network may be in the form of a buildings automation network or in the form of a power transmission and distribution network and comprises a multiplicity of local producers on which measurement data are respectively captured that need to be processed with access protection, since they comprise sensitive or security-critical data records. The regulation is based on an analysis result that is in turn computed from the captured measurement data. In one embodiment of the invention, the producers are in the form of local devices, sensors and/or actuators in a building's automation network that are able to interchange data via field bus systems, and the consumer (or the consumers) is in the form of a data consumer situated outside the buildings automation network.

The method comprises the following method steps that are carried out by the producer:
  measurement or provision of the measurement data from a multiplicity of sensors and classification of the measurement data into security levels
  checking of an admissibility of consumer-generated processing commands on the basis of the respectively classified security level and, in the event of a positive check:
  processing of the measurement data on the basis of the processing commands checked as admissible for the purpose of producing an analysis result data record
  transmission of the analysis result data record to the consumer. The analysis result data record can be used for the regulation of or for forecasting demand for the automation network.

The method involves ensuring that the confidential measurement data do not leave an environment of the respective local producer (that is to say of the energy consumer, such as e.g. a production installation, a household or further energy consumers). Exclusively the analysis result data record is communicated, which comprises no further sensitive data but which contains all the necessary information for regulating the network. This confidentiality aspect is important because a conclusion about the functioning and operation of the installation or about the behavior and habits of the energy consumer can be drawn from the local measurement data captured in situ, this being incompatible with the data protection aspects for protecting the energy consumer (and data producer). In accordance with one aspect, the method is characterized in that an analysis result or an analysis result data record can be provided on or for the consumer (e.g. on a device of the automation network or network operator) without the security-critical measurement data leaving the environment of the respective data producer. Which data records and measurement data are classified as security-critical and sensitive can be defined in a configuration phase of the method that precedes the actual regulatory method. These include e.g. presence measurement data, which use ultrasonic sensors, for example, to detect the presence of a person in the room, and personal data. Further examples of measurement data are measurement data that are captured by sensors for detecting the air quality in a room (for example by $CO_2$ sensors). From these measurement data, it is possible, by way of example, to infer whether and how many persons are in a room, and for how long. Therefore, they are regularly categorized as security-critical. A further example is the capture of the time profile of the power consumption (by an electricity meter with fine temporal resolution). From these data measurements, it is possible to read off the daily habits of occupants (for example standard presences and absences); therefore, they are categorized as security-critical and cannot leave the network of the data producer and hence also cannot be provided on a consumer without representing a high security risk.

The automation network may be a building's automation network that includes a multiplicity of local electronic field devices that use a bus system (particularly a field bus system) or a (communication) network to interchange data.

The field devices comprise a multiplicity of actuators and sensors on which measurement data are captured. The measurement data can be used for network monitoring and are used for network quality recording and malfunction recording. The precise measurement, capture and reporting of necessary information can be used, according to embodiments of the invention, for continual designation, adjustment and improvement of network quality. In this case, it is important that the producers may belong to different building professions, for example air conditioning, lighting, shading, ventilation and entry control systems. Advantageously, these data can nevertheless be applied centrally. The producers producing measurement data may furthermore comprise operator control elements, loads, switchgear cabinets and other technical units (in the building or in the network). In this exemplary embodiment, the consumer is a third entity situated outside the producer or outside the producer network. This may involve entities that provide services for the producer(s) or for third parties. The consumer may be an energy supplier, a smart grid provider or a network operator. The services comprise measurement data analysis for the control, regulation and/or optimization of the automation network.

The automation network may also be an electrical supply grid and comprise production installations, combinations of loads, but also individual loads, such as heat pumps, hot water tanks, freezers, automobile batteries.

In accordance with one form of embodiments of the invention, there is not only one central data consumer formed, such as e.g. a central energy supplier, but rather any number of data consumers. The captured measurement data are processed on the producer to produce one or more analysis results that is/are then forwarded to the consumers, so that they can provide various (configurable) value-added services for buildings by virtue of e.g. particular energy uses or load shifts in the building being able to be proposed to the operator of the building as a control data record in order to optimize the coordination between supplier and consumer. In this case, the different data consumers can assume different roles. In other words, a data consumer can assume different roles each time in relation to the evaluation and analysis of the measurement data.

In accordance with one aspect of the invention, there is provision for multiple consumers to be provided that the various producers each individually equip with applicable rights (particularly access rights to the measurement data or to security levels of the measurement data). If desired, these consumers can also be provided with specific, individually matched supplies of analysis primitives. The various consumers can take the received data as a basis for providing value-added services that process the received data and, for their part, again provide data, so that the consumers for their part appear as producers.

In one preferred variant form of the invention, the method according to embodiments of the invention can be carried out exclusively on the producer or in the area of influence of the producer. In this case, the consumer need only have an applicable interface for data communication.

The network for data transmission (particularly between producer and consumer) is preferably a different network than the automation network or power supply network and can be operated as a wired and/or wireless telecommunication network, mobile radio network, WLAN or LAN or as another network for digital data communication. It may be in the form of a public network. Within an environment of the producer, it is possible for data and particularly measurement data to be interchanged and processed without a security risk. However, as soon as the data leave the environment of the producer, e.g. when they are meant to be transmitted to the consumer, it is necessary for security and access protection aspects to be taken into consideration. According to embodiments of the invention, it is therefore ensured that the security-critical measurement data do not leave the environment of the producer. In one development of the invention, it is also possible for multiple producers to be combined to produce a more comprehensive producer network (e.g. within a building).

In another embodiment of the invention, the method comprises producer-end and consumer-end procedures, the data analysis always being carried out at the producer end, however, so that it is ensured that the measurement data or raw data do not leave the domain of the producer. The consumer-end procedures can comprise, by way of example, the operation of the data transmission (PUSH or PULL principle), time-based arrangements (when are measurement data meant to be requested), a rule-based system for producing processing commands from a set of analysis primitives, or further configuration rules.

The measurement data are captured by means of sensors and relate to physical parameters that accumulate locally within the context of the supply of energy to the energy consumer or are relevant to the evaluation of energy efficiency. In a further, preferred embodiment of the invention, the measurement data relate to different network resources or parameters. In the area of buildings automation, the sensors can relate particularly to the following parameters:
room temperature
air quality, e.g. amount of $CO_2$, CO, $O_2$ or further gases
presence sensor (for detecting the presence of a person in the room, e.g. infrared sensor)
sensors that indicate the open state of windows and doors
operating time and energy consumption of light, air conditioning installations, heaters, vents, cooling installations, washing machines and/or other energy consumers
operating time and current generation of photovoltaic installations, cogeneration installations
scheduling data from diaries, occupancy schedules
space use data through correlation of presence data and occupancy schedules.

In one advantageous embodiment of the method, the measurement data are captured on different producers. The measurement data are usually captured locally in principle. The analysis result is meant to be provided centrally in electronic form at the automation network operator and energy supplier ends.

In accordance with one aspect of the invention, the analysis result data record has a lower security level than the respectively processed measurement data. A security level is characterized by the scope of the respectively required access protection and authorization measures. A lower security level can therefore mean that the data are less security-critical. The measurement data normally directly or indirectly (by means of further processing steps) allow inference of sensitive data that need to be protected against unauthorized access. As such, by way of example, the measurement data record is a security-critical datum with respect to presence measurement. The solution according to embodiments of the invention is used to ensure that no unauthorized access to the information is possible when e.g. a person is in a particular room or section of a building. The combination of measurement data records from different sensors can also give rise to security-critical data records. If e.g. the sensor data from room occupancy schedules are combined with the sensor data from presence data, then a sensitive data record is regularly produced that sometimes allows inference of the person working in this room, which is incompatible with protection of personality rights and occupational safety provisions. Accordingly, it is necessary to ensure that this data record does not leave the security domain of the producer. To make matters worse, it is necessary to take into consideration that a security-critical datum can also be produced when two or more inherently non-security-critical data records are combined or applied. For this reason, the solution according to embodiments of the invention ensures that none of the captured measurement data records leave the domain of the data producer.

In one advantageous development of the invention, analysis primitives are produced. The analysis primitives are used for configuring the data evaluation and analysis. The analysis primitives can be provided in the style of building blocks, preferably at the data consumer end, in order to designate specific processing commands for the data analysis. In this case, embodiments of the invention provides for the respective security level for the data that are to be processed to be taken into consideration. In other words, it is automatically guaranteed that the respective consumer can also select only the building blocks or analysis primitives for which it has an entitlement. In accordance with one embodiment of the invention, there is provision for a respective producer to individually designate the analysis primitives for each of "its" consumers (that is to say for each consumer that receives its analysis results).

In one preferred embodiment of the invention, the roles of producer and consumer can be allocated adaptively depending on the application.

In order to compute the respective authorization of a consumer, one advantageous development of the invention provides for a rule-based system on the consumer that is designated to take the respective security level of the underlying measurement data as a basis for computing an authorization for the consumer. This means that, on the consumer, only those analysis primitives are provided for selection that is also admissibly activatable by it for the classified security level of the measurement data. Preferably, there is provision for the authorizations to be computed by the producer.

In one advantageous development of the invention, the method comprises an availability inquiry.
To this end, the following method steps may be provided, in particular:
  production of an availability inquiry on the consumer or on a node that is associated with the consumer
  transmission of the availability inquiry for analysis data of the consumer to the producer, and
  transmission of an availability message as a response to the availability inquiry from the producer to the consumer with the information regarding whether the requested data are on hand or can be provided.

The approach described above can also be described as a PULL principle where the inquiry activity comes from the consumer of the data and is initiated by said consumer.

Alternatively, a PUSH principle can also be used where the data producer initiates the data interchange and notifies the consumer that usable measurement data are on hand with at least one data producer. In this case, there is additionally the option of also using spooling, where a report to the consumer is produced only when a predesignatable minimum amount of measurement data is available or when measurement data from predesignated sensors are on hand.

This allows the data interchange method to be designed more efficiently, and the transmission bandwidth of the network can be used less.

In one preferred embodiment of the invention, there is provision for the analysis primitives to be produced on a case-specific basis, particularly produced in a manner specific to each analysis or availability inquiry. This has the associated technical advantage that the consumer can also select or use only the analysis primitives that are available to it on the basis of its authorization. Hence, the consumer is not offered analysis primitives that it cannot access on the basis of its authorization or the underlying data. This makes it possible to prevent it from selecting building blocks and creating a configuration for which it then ultimately receives the notice "permission denied". This allows the analysis method to be formed more efficiently.

In a further, preferred embodiment of the invention, the measurement data are captured on different producers and processed on a dedicated producer node. This allows the efficiency analysis for regulating the automation network to be formed more flexibly. From the set of producer nodes, it is possible to designate one from this set as a dedicated producer node on which the computations for communication with the data consumer are carried out. Alternatively, a separate or dedicated node in the network can be provided for undertaking this function. For this node, a software module is then preferably formed that is designated to carry out the producer-end steps of the method. The analysis result data record is then transmitted to the consumer via a communication network. Said consumer then merely needs to be designed to have an interface for receiving this data record.

In a further, preferred embodiment of the invention, the processing commands for analyzing the measurement data are generated by the consumer and transmitted to the producer. In accordance with one development of the invention, there is provision for the production of the processing commands to be supported by the provision of analysis primitives in the style of a modular construction system. The user at the side of the consumer then need only select primitives that are offered to him in order to designate a particular analysis function. In this case, he is preferably offered only the primitives for which he has access authorization with regard to the underlying measurement data. The access authorization can further or alternatively also be made dependent on what type of consumer it is. To this end, consumers can be categorized into designated classes. The class then designates the type of analysis functions that can be admissibly carried out.

In a further, preferred embodiment of the invention, the processing of the measurement data comprises application of statistical and mathematical operators, such as averaging, convolutions, summations, histogram-based methods or correlations. The operators can be carried out by software functions.

In a further, preferred embodiment of the invention, the processing commands for processing the measurement data are produced using a rule-based system. The rule-based system can be configured independently of a system on the producer and in particular independently of a producer unit for the analysis primitives. This means that it is also possible for specific requirements at the consumer end (e.g. as far as the target format, the number of reports, the time frame for delivery of analysis results, etc. is concerned) to be changed or added or deleted independently of the operation of the data producer, which increases flexibility.

The way in which the object is achieved has been described above on the basis of the method. Features, advantages or alternative embodiments mentioned can likewise also be transferred to the other claimed subjects, and vice versa. In other words, the objective claims (directed to a system or to a computer program product, for example) may also be developed with the features that are described or claimed in connection with the method. The corresponding functional features of the method are in this case formed by appropriate objective modules, particularly by hardware modules or microprocessor modules, of the system or of the product, and vice versa.

In accordance with a further aspect, the invention relates to a network system for the regulation of an automation network and for the communication of confidential measurement data between one or more local producers, producing measurement data, and at least one consumer, having:

- a multiplicity of sensors that are designated at the producer end for the purpose of providing measurement data
- a classification unit that is designated for the purpose of classifying the measurement data into security levels
- a checking unit that is designated for the purpose of checking an admissibility of consumer-generated processing commands on the basis of the respectively classified security level
- a processor that is designated for the purpose of processing the measurement data on the basis of the processing commands checked as admissible for the purpose of producing an analysis result data record and is provided at the producer end
- a network for transmitting the analysis result data record to the consumer for the purpose of regulating the automation network.

In accordance with one preferred embodiment of the invention, the checking unit of the network system is provided at the producer end. Alternatively, it may also be formed at the consumer end, or the checking unit comprises two modules that are arranged both at the producer end and at the consumer end.

A further way of achieving the object involves a computer program product that is loaded or loadable into a memory of a computer, with computer program code for performing the method described in more detail above when the computer program product is executed on the computer.

A further way of achieving the object provides for a computer program having computer program code for performing all the method steps of the method described in more detail above when the computer program is executed on a computer. In this case, it is also possible for the computer program to be stored on a medium that is readable by a computer.

BRIEF DESCRIPTION

Some of the embodiments will be described in detail, with reference to the following figures, wherein like designations denote like members, wherein:

FIG. 4 shows a communication diagram between data producer and data consumer in accordance with a further embodiment of the invention;

FIG. 5 shows a block diagram of a network system in accordance with an embodiment of the invention, and FIG. 6 shows a block diagram of a data producer in accordance with a preferred embodiment of the invention.

DETAILED DESCRIPTION

Figure 1:
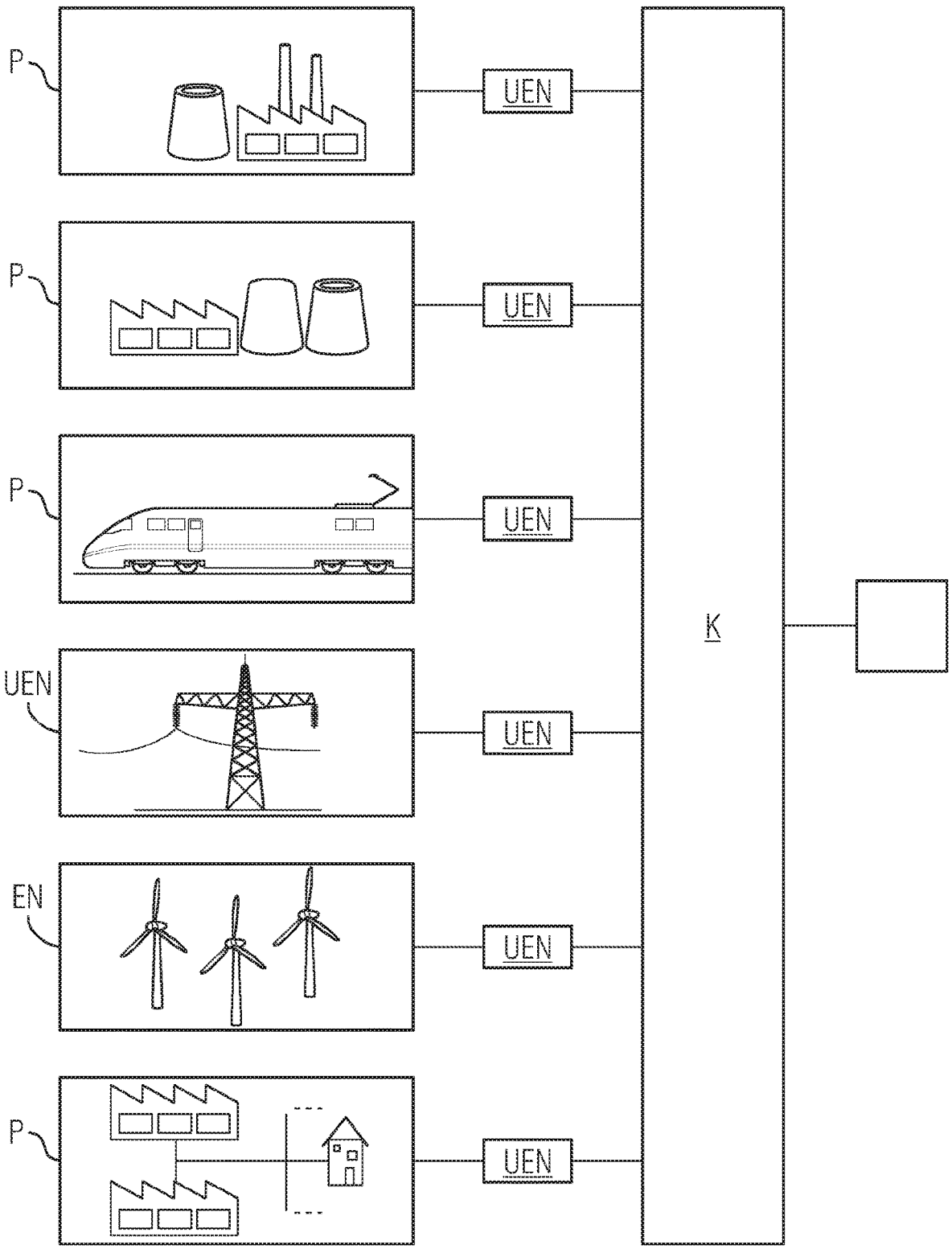
FIG. 1 shows a block diagram of an analysis system for measurement data of a power supply network in accordance with a preferred embodiment of the invention.

FIG. 1 shows a schematic depiction in the style of an overview of a network system for the data interchange of analysis result data using the example of an power supply system that comprises a multiplicity of local producers (data producers) P and one or more consumers K (analysis result consumers), and also one or more interposed bus systems or networks.

FIG. 1 shows different data producers P that can act as energy consumers, such as production installations, electrical supply grids of public means of transport such as the railway, transmission networks UEN or supply networks EN of regenerative energy sources or households. The consumer K is a smart grid provider or an energy supplier or a provider of other network services, a network node associated therewith, a network operator or a node that can interchange data with the network operator. The consumer is a recipient of analysis result data records AE that are provided by the producer P. The analysis result data records AE are used to regulate the automation network, particularly with regard to the efficiency thereof.

The analysis result data record AE provides information about whether the supply grid can perform its task for grid supply (e.g. for electric power distribution). This can take into consideration rules for network operation—e.g. of transmission networks—that are applied at the consumer K end with the analysis result data record AE.

In one preferred embodiment, the automation network is operated by a buildings automation network operator, which requires, inter alia, technical planning data (e.g. in the form of predictions for energy consumptions) in the form of an analysis result data record AE. Depending on the type of consumer K, the latter is interested in different information, such as e.g. in a prediction of the energy requirement over the day in quarter-hour intervals over a particular whole building or parts thereof. In this regard, the energy consumptions that will arise as a result of a planned use of rooms and the associated installations (such as e.g. room air conditioning and heating) are ascertained on the producer P by means of combination with presence data collected in the past about the typical occupancy of the respective rooms. Statistical methods, such as averaging over different specific presence data, prevents sensitive data (e.g. the number of persons who have taken part in a particular meeting) from being able to be derived. The analysis result data record or the analysis result AE in this case consists of the prediction of the energy requirement. From the predicted energy requirement, the energy supplier K can plan its production or possibly provide incentives to shift consumptions over time. This allows an improvement in the utilization and/or the quality of the automation network and hence a reduction in costs. An important technical advantage is that the consumer K can control and regulate the automation system for the building in optimized fashion using the analysis result AE on the basis of the currently ascertained state data and measurement data MD. The measurement data MD thus flow indirectly and the analysis result data record AE flows directly into a control loop at the consumer K end and are implemented there in order to designate control parameters that are used to control and/or regulate the automation network.

The text above has described an embodiment of the invention on the basis of an automation network for buildings automation. The following can, however, also be transferred to other networks that likewise relate to sensitive data, such as e.g. production planning systems or further distributed embedded systems. The producer may be the production installation and machines, which act as consumer from a central service provider or provider of the machines. In the case of technical production installations, which are normally formed with a multiplicity of local production devices and tools, the solution proposed here can likewise be used in order to centrally regulate the production devices and tools on a regulatory node that is incorporated in the network NW. In this case, a central node acts as consumer K, which additionally takes on the function of evaluation and in this case evaluates e.g. the service lives of the locally operated tools, the maintenance cycles thereof, the error messages thereof (which act as a measurement data producer) and regulates them on the basis of the respectively currently measured measurement data MD using centrally produced processing commands. Depending on the allocation of roles, it is necessary for it to be ensured that the consumer receives only the analysis data records AE for which it also has access authorization. This is achieved in accordance with embodiments of the invention by virtue of the consumer K receiving not the measurement data MD directly but rather only a processed form of the measurement data MD, which have a lower security level.

Figure 2:
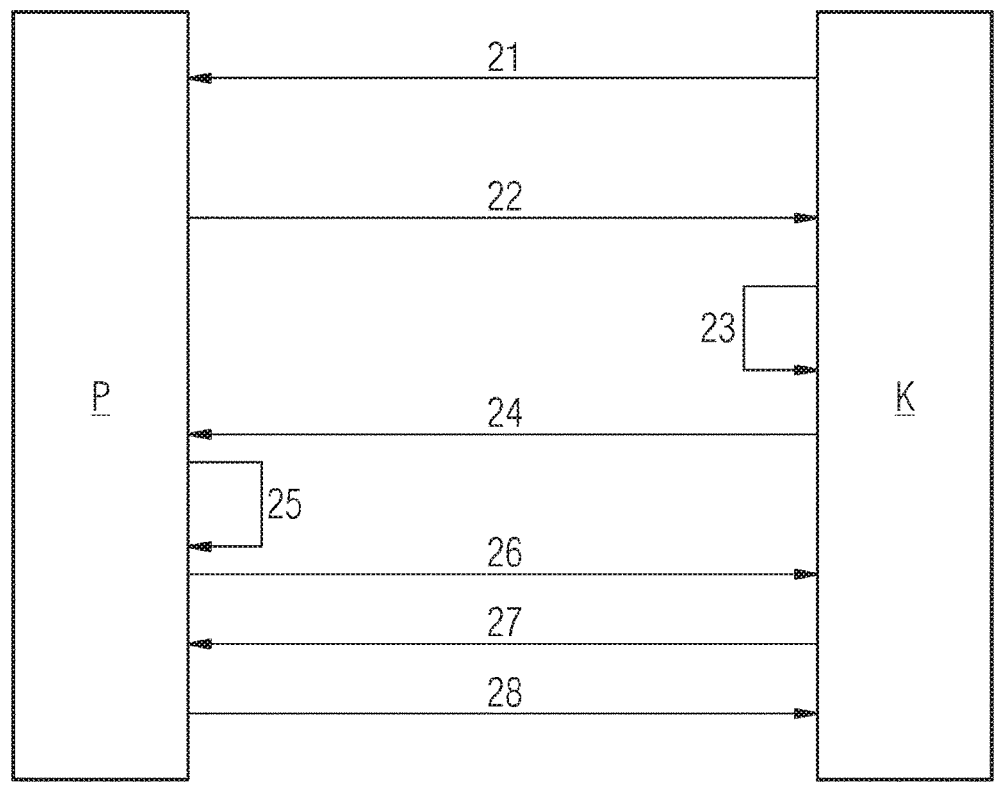
FIG. 2 shows a communication diagram between data producer and data consumer in accordance with a preferred embodiment of the invention.

FIG. 2 shows a communication diagram of an embodiment of the invention in which a PULL principle is used for the data interchange. This means that the data interchange is triggered by the inquiring consumer K. The consumer K requests measurement data MD or analysis data according to preconfigurable criteria (on a time-dependent basis, periodically or under event control). To this end, it sends an inquiry message in step 21 to the producer P, which subsequently, in step 22, generates and returns a response message that indicates the availability of raw data and/or data analysis primitives for the production of processing commands. Following reception of this response message, the consumer K produces the processing commands in step 23. To this end, it can use analysis primitives provided by the producer P. The analysis primitives are explained in more detail below. In step 24, the processing commands produced are transmitted to the producer P. This is effected using a communication network based on a configurable protocol. Optionally, it is also possible for further data records, e.g. an authentication feature of the consumer K, to be transmitted. Following reception of the processing commands, the producer P checks, in step 25, the admissibility of the received processing commands, particularly for their compatibility with the access rights of the consumer K, which are likewise kept for it on or in the producer. In step 26, a confirmation signal regarding the admissibility of the data analysis is sent to the consumer K with the processing commands. Subsequently, the consumer K sends an activation signal to the producer P in step 27 in order to execute the data analysis there and to confirm the inquiry. This signal interchange 26, 27 has the technical background that increased security and additionally temporal flexibility can be achieved. The analysis is carried out only and precisely when the consumer K also confirms this in step 27. Subsequently, the analysis and evaluation of the measurement data MD is carried out on the producer P with the processing commands checked as admissible, so that in step 28 the analysis result data record AE can be transmitted to the consumer K in a preconfigurable format (periodically or continually, gathered in a packet message or individually) without the sensitive data on which the analysis is based leaving the domain of the producer P.

The text below will explain the analysis primitives in more detail. These are building blocks from an analysis construction set that can be provided by the producer P and delivered with the response message. The analysis primitives are in turn a selection from a set of fundamentally available processing building blocks that are ascertained by the producer P on the basis of the measurement data MD on which the analysis is based and/or the respectively ascertained security level, however. Furthermore, when the analysis primitives are produced, it is also possible for a set of rules to be used that maps specific requirements of the producer P concerning the confidentiality of the measurement data MD or that maps requirements in respect of the inquiring consumer K regarding the requested data from the producer P. This means that the control system can be adapted very specifically to the respective conditions and circumstances of the system. To create the data analysis primitives, a software tool can be provided. The tool comprises a description of the combination of the respective primitives. In this case, the description can be provided in a platform- and implementation-independent format, e.g. in XML. The use of the analysis primitives can be used to achieve the technical effect that the consumer K can also produce only the processing commands that are admissible for it and for the requested measurement and analysis data in the ascertained confidentiality stage in the first place.

Figure 3:
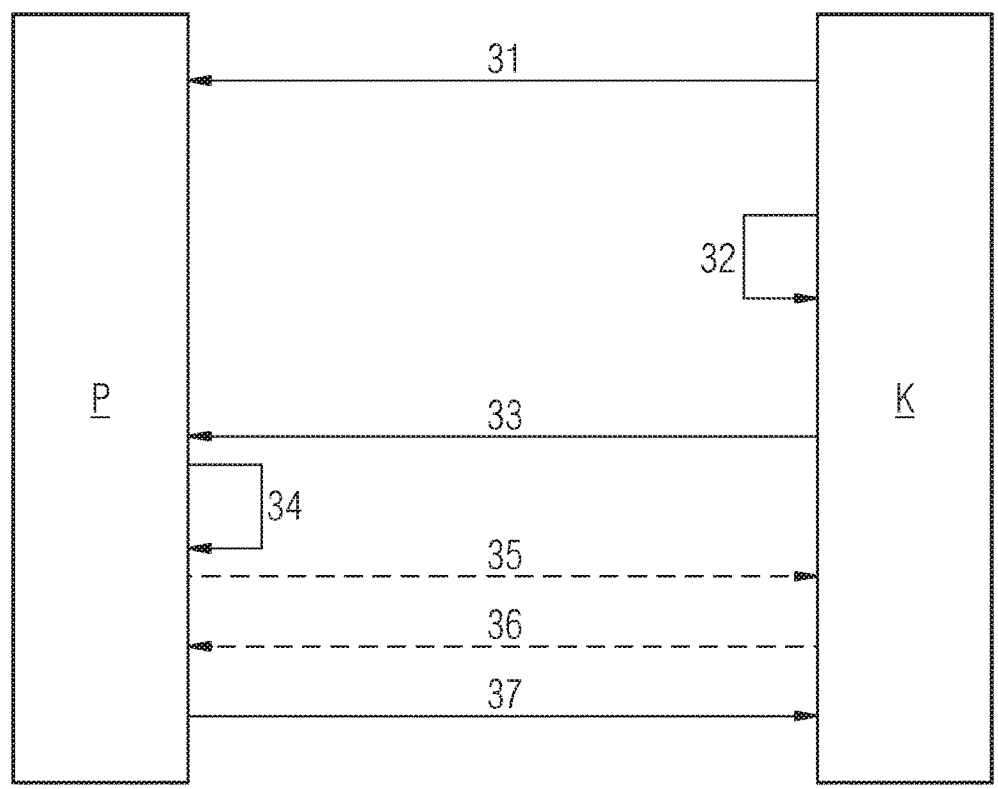
FIG. 3 shows a communication diagram between data producer and data consumer in accordance with a further embodiment of the invention.

FIG. 3 depicts an alternative embodiment to FIG. 2. Individual features or steps of the embodiment of FIGS. 3 and 2 can also be combined, however. In FIG. 3, a PUSH mode is described in more detail. In this case, the data interchange is initiated from the producer P. As soon as the latter has measured new measurement data MD or as soon as designated criteria for the measurement data capture MD are satisfied (these being able to be defined by the producer P and/or by the consumer K), a notification is produced and sent in step 31 indicating that measurement data MD are on hand and can be evaluated for an analysis. In step 32, the consumer K subsequently produces the processing commands, which it transmits to the producer P in step 33. The latter checks the admissibility of the received processing commands for compatibility with the access rights to the sensitive measurement data MD (depending on the ascertained security level) in step 34 and, if it has checked the processing commands as admissible, then different embodiments of the invention are available. Firstly, it can carry out the analysis of the measurement data MD directly with the processing commands so as then to transmit the result AE to the consumer K in step 37. Similarly, it can use the method described in more detail above in connection with FIG. 2, in which, first of all, in step 35, a confirmation signal is transmitted that is answered by the consumer K with an activation signal in step 36 so as only then to start the analysis computation. Since the signals 35 and 36 are therefore optional, they are depicted in dashes in FIG. 3.

FIG. 4 shows a further embodiment of the invention. In step 41, a notification or message is sent by the producer P that is intended to signal the presence of new measurement data MD (PUSH mode). In step 42, analysis primitives are produced directly on the producer P and are then transmitted to the consumer in step 43. The messages 41 and 43 can also be combined. Following receipt of the analysis primitives on the consumer K, the latter produces, in step 44, the processing commands that it needs for its evaluation. In this case, it has only the admissible primitives available. The processing commands produced are then transmitted in step 45 to the producer P so as to be executed there, which means that the latter can provide the analysis result AE to the consumer K in step 46.

A common feature of all the embodiments of the invention is that the processing commands are always produced by the consumer K, possibly using analysis primitives that are provided by the producer, and that the processing of the measurement data MD with the analysis computation is always carried out by the producer.

FIG. 5 schematically shows the principle on which embodiments of the invention is based. The network NW provided between consumer K and producer P does not have to be identical to the automation network. It is used for transmitting messages, commands and signals (as described above) and the analysis result AE computed on the producer P. The measurement data MD on which the computation is based do not leave the domain of the producer P. The producer P produces measurement data MD and the consumer K consumes analysis results AE and no measurement data MD. From the analysis result data records AE, control parameters are automatically produced that are then used for regulating the network. Usually, multiple producers P are combined to form a producer network.

The design of a producer P is shown more precisely in FIG. 6. The producer P interacts with the consumer K via the network NW. The producer P comprises a multiplicity of sensors S that supply different types as raw data. In accordance with one embodiment, these raw data are initially supplied to a processing stage in order to produce measurement data MD from the raw data. This is accomplished using methods of debugging and quality assurance.

Furthermore, the raw data are converted into a standard format and into a standard accuracy level for further processing. Furthermore, the raw data can be augmented with context information required for processing them (e.g. time stamps, location coordinates, physical unit of the measured variable, identity of the subsystem from which the data come, etc.).

In a simpler embodiment, the raw data tapped off from the sensors S are processed directly as measurement data MD. They are supplied to a classification unit KL that is designated to categorize the measurement data into security levels. In this case, preconfigured rules can be used (e.g. "The measurement data from nuclear power stations always have the highest security level"). In addition, a checking unit is provided that is designated to check the processing commands received from the consumer K for compliance with the admissibility requirements. The checking unit may also be designed to generate analysis primitives for the measurement data MD on the basis of the security level thereof. A processor Z is used for processing the measurement data MD by means of the processing commands checked as admissible. Preferably, the classification unit KL, the checking unit PR and the processor Z are not formed as standalone separate components, but rather the classification unit KL and the checking unit PR are integrated in the processor Z.

Finally, it should be pointed out that the description of embodiments of the invention and the exemplary embodiments are fundamentally not intended to be understood as limiting with regard to a particular physical implementation of embodiments of the invention. All features explained and shown in conjunction with individual embodiments of the invention may be provided in a different combination in the subject matter according to embodiments of the invention so as to produce their advantageous effects at the same time.

The scope of protection of embodiments of the present invention is provided by the claims that follow and is not restricted by the features explained in the description or shown in the figures.

To a person skilled in the art, it is clear, in particular, that embodiments of the invention can be used not only for automation networks but also for other local systems or networks that are controlled and/or regulated via a central node. Furthermore, the components of the producer P and/or of the consumer K may be implemented in a manner distributed over multiple physical products.

Although the invention has been described and illustrated in detail by way of the preferred exemplary embodiment, the invention is not restricted by the disclosed examples and other variations can be derived herefrom by a person skilled in the art without departing from the scope of protection of the invention.

For the sake of clarity, it is to be understood that the use of 'a' or 'an' throughout this application does not exclude a plurality, and 'comprising' does not exclude other steps or elements.

The invention claimed is:

1. A method for the regulation of an automation network by at least one central consumer on the basis of confidential measurement data that are captured on one or on a multiplicity of local producers, comprising the following method steps:
   by the producer: measurement or provision of the measurement data from a multiplicity of sensors and classification of the measurement data into security levels, wherein the security level is determined for each measurement data produced based on the type of data present in the measurement data,
   checking of an admissibility of consumer-generated processing commands on the basis of the respectively classified security level by the producer and, in the event of a positive check:
      by the producer: processing of the measurement data on the basis of the processing commands checked as admissible for the purpose of producing an analysis result data record, and
      transmission of the analysis result data record to the consumer for the purpose of regulating the automation network.

2. The method as claimed in claim 1, wherein the confidential measurement data do not leave an environment of the respective producer in any form.

3. The method as claimed in claim 1, in which the analysis result data record has a lower security level than the respectively processed measurement data.

4. The method as claimed in claim 1, in which analysis primitives are produced and, on the basis of the respective security level of the underlying measurement data, are provided on the consumer for selection such that different analysis primitives can be combined in order to produce the processing commands.

5. The method as claimed in claim 4, in which the analysis primitives are produced specifically on a case-specific basis and for each analysis or availability inquiry.

6. The method as claimed in claim 1, in which the measurement data are captured on different producers and processed on a dedicated producer node.

7. The method as claimed in claim 1, in which the measurement data relate to different network resources.

8. The method as claimed in claim 1, in which the processing commands for analyzing the measurement data are generated by the consumer and transmitted to the producer.

9. The method as claimed in claim 1, in which the method comprises an availability inquiry:
   transmission of an availability inquiry for analysis data of the consumer to the producer and/or
   transmission of an availability message from the producer to the consumer.

10. The method as claimed in claim 1, in which the processing of the measurement data comprises application of statistical and mathematical operators, such as averaging, convolutions, summations, histogram-based methods or correlations.

11. The method as claimed in claim 1, in which the processing commands for processing the measurement data are produced using a rule-based system.

12. A network system for the regulation of an automation network by at least one central consumer on the basis of confidential measurement data that are captured on one or on a multiplicity of local producers, having:
   a multiplicity of sensors that are designated at the producer end for the purpose of providing measurement data;
   a classification unit that is designated for the purpose of classifying the measurement data into security levels, wherein the security level is determined for each measurement data produced based on the type of data present in the measurement data;
   a checking unit that is designated for the purpose of checking an admissibility of consumer-generated processing commands on the basis of the respectively classified security level;
   a processor that is designated for the purpose of processing the measurement data on the basis of the processing commands checked as admissible for the purpose of producing an analysis result data record and is provided at the producer end; and
   a network for transmitting the analysis result data record to the consumer, wherein the consumer is designated to regulate the automation network on the basis of the transmitted analysis result data record.

13. The network system as claimed in claim 12, in which the classification unit and/or the checking unit is provided at the producer or consumer end.

* * * * *